(12) United States Patent
Ma et al.

(10) Patent No.: US 9,140,830 B2
(45) Date of Patent: *Sep. 22, 2015

(54) ANNULUS SCATTERING DIFFUSER FOR DISPLAY WITH REFLECTIVE SURFACE

(71) Applicant: QUALCOMM MEMS Technologies, Inc., San Diego, CA (US)

(72) Inventors: Jian Ma, Carlsbad, CA (US); John Hyunchul Hong, San Clemente, CA (US); Bing Wen, Poway, CA (US)

(73) Assignee: QUALCOMM MEMS Technologies, Inc., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/269,520

(22) Filed: May 5, 2014

(65) Prior Publication Data

US 2014/0240813 A1 Aug. 28, 2014

Related U.S. Application Data

(63) Continuation of application No. 13/540,886, filed on Jul. 3, 2012, now Pat. No. 8,717,660.

(51) Int. Cl.
*G02B 26/00* (2006.01)
*G02B 26/08* (2006.01)
(Continued)

(52) U.S. Cl.
CPC ............ *G02B 5/0252* (2013.01); *G02B 3/0056* (2013.01); *G02B 5/001* (2013.01); *G02B 5/0215* (2013.01); *G02B 26/001* (2013.01); *G09G 3/3466* (2013.01); *G09G 2300/0469* (2013.01); *G09G 2300/06* (2013.01); *G09G 2310/0208* (2013.01); *Y10T 156/10* (2013.01)

(58) Field of Classification Search
USPC .......... 359/290–295, 298, 619, 320, 321, 319
See application file for complete search history.

(56) References Cited

U.S. PATENT DOCUMENTS 5,035,490 A 7/1991 Hubby, Jr.
5,959,711 A 9/1999 Silverstein et al.
(Continued)

FOREIGN PATENT DOCUMENTS

EP 1070984 A1 1/2001
EP 1197765 A1 4/2002
(Continued)

OTHER PUBLICATIONS

International Search Report and Written Opinion—PCT/US2013/048914—ISA/EPO—Aug. 21, 2013.
(Continued)

*Primary Examiner* — Mohammed Hasan
(74) *Attorney, Agent, or Firm* — Knobbe Martens Olson & Bear LLP

(57) ABSTRACT

This disclosure provides systems, methods and apparatus for enhancing the brightness and/or contrast ratio of display devices. In one aspect, the display devices can include an annular diffuser that is configured to scatter light into a ring shaped region. The annular diffuser can include a plurality of axicon lenses or holographic features. The reflective display can include an annular diffuser to shift the direction along which most of the modulated light is scattered away from the direction along which light is specularly reflected by the display devices to reduce specular glare and enhance brightness and/or contrast ratio.

17 Claims, 15 Drawing Sheets

(51) Int. Cl.
  *G02B 5/02* (2006.01)
  *G02B 3/00* (2006.01)
  *G02B 5/00* (2006.01)
  *G09G 3/34* (2006.01)

(56) References Cited

U.S. PATENT DOCUMENTS

| | | | |
|---|---|---|---|
| 6,898,012 B2 * | 5/2005 | Kaminsky et al. | 359/599 |
| 7,009,772 B2 | 3/2006 | Hsiao et al. | |
| 7,321,456 B2 | 1/2008 | Cummings | |
| 7,508,571 B2 | 3/2009 | Gally et al. | |
| 7,515,327 B2 * | 4/2009 | Cummings | 359/290 |
| 7,630,123 B2 | 12/2009 | Kothari | |
| 8,045,256 B2 | 10/2011 | Kothari | |
| 8,717,660 B2 | 5/2014 | Ma et al. | |
| 2007/0177116 A1 | 8/2007 | Amako | |
| 2008/0117519 A1 | 5/2008 | Chari et al. | |
| 2011/0241977 A1 | 10/2011 | Powell | |

FOREIGN PATENT DOCUMENTS

| | | |
|---|---|---|
| JP | 2002250806 A | 9/2002 |
| WO | WO-2006036451 A1 | 4/2006 |

OTHER PUBLICATIONS

Luminit, "Direction Turning Film," Downloaded from the web at http://www.iurninitco.com in 2 pages, Date unavailable.
Notice of Reasons for Rejection—JP 2015-520622—Jul. 6, 2015.

* cited by examiner

| | Common Voltages | | | | |
|---|---|---|---|---|---|
| Segment Voltages | | VC<sub>ADD_H</sub> | VC<sub>HOLD_H</sub> | VC<sub>REL</sub> | VC<sub>HOLD_L</sub> | VC<sub>ADD_L</sub> |

| Segment Voltages | Common Voltages | | | | |
|---|---|---|---|---|---|
| | $VC_{ADD\_H}$ | $VC_{HOLD\_H}$ | $VC_{REL}$ | $VC_{HOLD\_L}$ | $VC_{ADD\_L}$ |
| $VS_H$ | Stable | Stable | Relax | Stable | Actuate |
| $VS_L$ | Actuate | Stable | Relax | Stable | Stable |

Normal Incident

10° Incident angle

ANNULUS SCATTERING DIFFUSER FOR DISPLAY WITH REFLECTIVE SURFACE

CROSS-REFERENCE TO RELATED APPLICATIONS

This application is a continuation of U.S. application Ser. No. 13/540,886, filed on Jul. 3, 2012, U.S.Pat. No. 8,717,660 B2 entitled "ANNULUS SCATTERING DIFFUSER FOR REFLECTIVE DISPLAY," and assigned to the assignee hereof. The disclosure of the prior application is considered part of, and is incorporated by reference in, this disclosure.

TECHNICAL FIELD

This disclosure relates to diffusers and more particularly to diffusers that can shift the viewing angle away from the direction of specular reflection associated with the direction from which light is incident. The diffusers disclosed herein can be integrated with electromechanical systems based display devices.

DESCRIPTION OF THE RELATED TECHNOLOGY

Electromechanical systems (EMS) include devices having electrical and mechanical elements, actuators, transducers, sensors, optical components (such as mirrors and optical film layers) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

The brightest viewing angle in various display devices often coincides with the direction along which incident light is specularly reflected from the different parts of the display device (for example, display elements, cover glass, etc.). Various systems and methods have been developed to reduce glare from specularly reflected incident light to enhance brightness of the display device.

SUMMARY

The systems, methods and devices of the disclosure each have several innovative aspects, no single one of which is solely responsible for the desirable attributes disclosed herein.

One innovative aspect of the subject matter described in this disclosure can be implemented in a display device having a surface normal. At least a portion of light incident on the display device is incident from an incidence direction relative to the surface normal. A direction of specular reflection is associated with the incidence direction. The display device comprises a plurality of reflective display elements that are configured to modulate light incident on the display device, and a first diffuser layer disposed over the plurality of reflective display elements. The first diffuser layer is configured to redistribute the incident light such that the light reflected from the display elements is redistributed into a ring shaped region between a first circular region having a first angle $\theta_1$ with respect to the direction of specular reflection and a second circular region having a second angle $\theta_2$ with respect to the direction of specular reflection, the second angle $\theta_2$ being larger than the first angle $\theta_1$, and the first angle $\theta_1$ is greater than 0 degrees. In various implementations, a value for $\theta_2-\theta_1$ can be greater than 5 degrees. In various implementations, $\theta_1$ can be between approximately 5 degrees and approximately 15 degrees. In various implementations, $\theta_2$ can be between approximately 10 degrees and approximately 30 degrees.

In various implementations, the first diffuser layer can include a plurality of axicon lenses. Each of the plurality of axicon lenses is cone shaped and has a base, an apex, and sloping sidewalls joining the apex to the base. The plurality of axicon lenses can be arranged in a random pattern. In various implementations, the sloping sidewalls can be straight or curved. In various implementations, a surface of the base can be flat or curved. The angle between the sloping sidewalls and the base of the cone can be selected to provide a desired value for the first angle $\theta_1$. In various implementations, at least one of the base and the sidewalls can be curved with a curvature. The plurality of axicon lenses can be disposed over each reflective display pixel. In various implementations, the plurality of axicon lenses can number between about 10 and 10,000 axicon lenses per display pixel. Each of the plurality of axicon lenses can have an area of the base that is between approximately 0.01% to approximately 10% of an area of the reflective display pixel. A density of the plurality of axicon lenses can be between approximately $10^5$ per cm$^2$ and approximately $10^9$ per cm$^2$. In various implementations, the first diffuser layer can include a plurality of holographic features. In various implementations, a second diffuser can be disposed over the plurality of reflective display elements.

Another innovative aspect of the subject matter described in this disclosure can be implemented in a display device having a surface normal, wherein at least a portion of the incident light is incident from an incidence direction relative to the surface normal, and wherein a direction of specular reflection is associated with the incidence direction. The display device comprises a plurality of reflective display elements configured to modulate light incident on the display device, and means for redirecting light. The redirecting means are disposed over the plurality of reflective display elements. The redirecting means are configured to redistribute the incident light such that the light reflected from the display elements is redistributed in a ring shaped region between a first circular region having a first angle $\theta_1$ with respect to the direction of specular reflection and a second circular region having a second angle $\theta_2$ with respect to the direction of specular reflection, the second angle being larger than the first angle, and the first angle greater than 0 degrees. In various implementations, the redirecting means can include a diffuser layer having a plurality of axicon lenses.

Another innovative aspect of the subject matter described in this disclosure can be implemented in a method of manufacturing a display device. The method comprises providing a plurality of reflective display elements that are configured to modulate light incident on the display device, and providing a diffuser layer that is disposed over the plurality of reflective display elements the display device. The display device has a surface normal. At least a portion of the incident light is incident from an incidence direction relative to the surface normal, and a direction of specular reflection is associated with the incidence direction. The diffuser layer is configured to redistribute the incident light such that the light reflected from the display elements is redistributed in a ring shaped region between a first circular region having a first angle $\theta_1$ with respect to the direction of specular reflection and a second circular region having a second angle $\theta_2$ with respect to the direction of specular reflection, the second angle being larger than the first angle, and the first angle greater than 0 degrees.

In various implementations, the diffuser layer can include a plurality of optical features including but not limited to a plurality of axicon lenses and a plurality of holographic features. In various implementations the optical features can be formed by a process including at least one of: embossing, imprinting and surface lithography. In various implementations, the plurality of reflective display elements can be disposed on a first side of a substrate, and the diffuser layer can be disposed on a second side of the substrate, the second side being opposite the first side. In various implementations, the diffuser layer can be disposed with a pressure sensitive adhesive. In various implementations, the diffuser layer can be laminated on the second side of the substrate. In various implementations, the plurality of reflective display elements and the diffuser layer can be disposed on the same side of the substrate. In various implementations, the diffuser layer can be disposed between the substrate and the plurality of reflective display elements.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
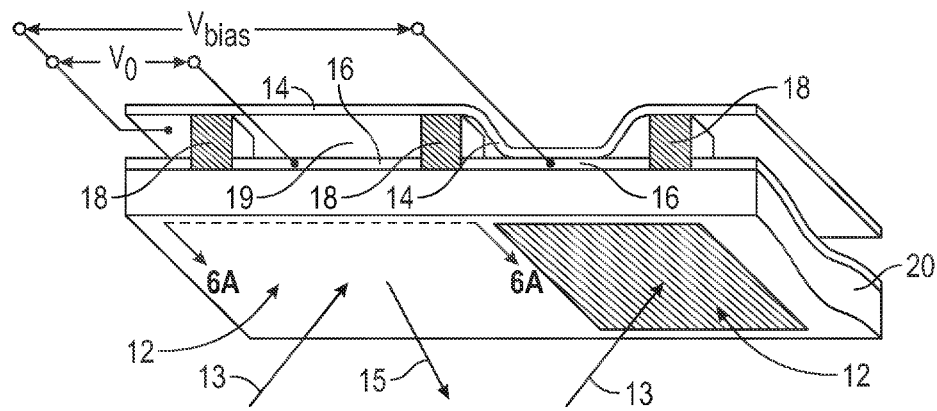
FIG. 1 shows an example of an isometric view depicting two adjacent pixels in a series of pixels of an interferometric modulator (IMOD) display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device or system that can be configured to display an image, whether in motion (for example, video) or stationary (for example, still image), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (for example, e-readers), computer monitors, auto displays (for example, odometer display, speedometer display, etc.), cockpit controls and/or displays, camera view displays (for example, display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (for example, in electromechanical systems (EMS), microelectromechanical systems (MEMS) and non-MEMS applications), aesthetic structures (for example, display of images on a piece of jewelry) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

As discussed below, in certain implementations of a display device, light incident on the display device can be modulated by display elements of the display device and scattered toward a viewing direction. Light incident on the display device may also be specularly reflected by a cover window and/or other layers that can be included in the top portions of the display device. In some implementations, the viewing direction in which the modulated light is brightest substantially coincides with the direction of specular reflection, and the specularly reflected light may reduce or degrade the brightness of modulated light. Additionally, the substantial coincidence of the specular reflection direction with the viewing direction having maximum brightness may reduce or degrade the contrast ratio of the display device.

Accordingly, in various implementations described herein, a diffuser can be used to shift the direction of the modulated light away from the direction of specular reflection to reduce or eliminate glare from specularly reflected light. For example, the diffuser can have a forward scattering profile in which light from an incoming direction is scattered away from the incoming direction and into an annular, ring-shaped region relative to the incoming direction. In various implementations, the diffuser can include an array of axicon lenses or holographic features. Axicon lenses can have conical surfaces that refract light into annular regions. The diffuser may advantageously be used with a reflective display device in which the display elements include an electromechanical system device (for example, an interferometric modulator).

Particular implementations of the subject matter described in this disclosure can be used to realize one or more of the following potential advantages. Various implementations of a display device including a diffuser having an annular forward scattering profile can be used to reduce or eliminate the coincidence between the direction of propagation of the modulated light from the display device and the direction of propagation of light specularly reflected from various parts of the display device (for example, the display cover, the display element, etc.) to reduce, mitigate and/or eliminate glare from the incident light that is specularly reflected from surfaces of different parts of the display device. Additionally, various implementations of a display device including a diffuser having an annular forward scattering profile can use the display illumination or the available ambient light efficiently by directing the modulated light away from the direction along which light is specularly reflected. Accordingly, various implementations of a display device including a diffuser having an annular forward scattering profile can have increased brightness and/or contrast ratio (as compared to devices without such a diffuser). Reducing or eliminating the coincidence between the direction of propagation of the modulated light from the display device and the direction of propagation of light specularly reflected from various parts of the display device can also improve the color saturation of the display colors.

An example of a suitable EMS or MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity. One way of changing the optical resonant cavity is by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, for example, to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when actuated, absorbing and/or destructively interfering light within the visible range. In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, such as chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and electrical conductor, while different, electrically more conductive layers or portions (e.g., of the optical stack 16 or of other structures of the IMOD) can serve to bus signals between IMOD pixels. The optical stack 16 also can include one or more insulating or dielectric layers covering one or more conductive layers or an electrically conductive/optically absorptive layer.

In some implementations, the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than <10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, a voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
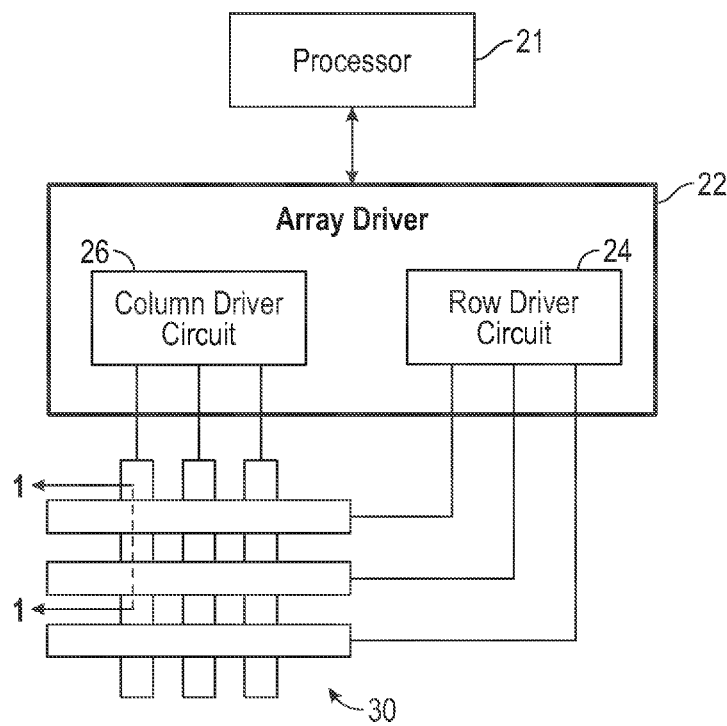
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, for example, a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
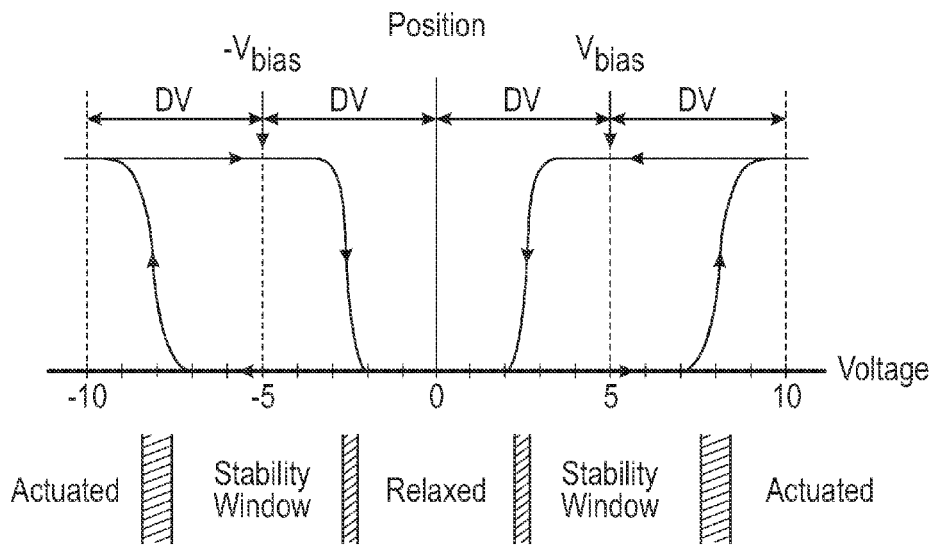
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may use, in one example implementation, about a 10-volt potential difference to cause the movable reflective layer, or mirror, to change from the relaxed state to the actuated state. When the voltage is reduced from that value, the movable reflective layer maintains its state as the voltage drops back below, in this example, 10 volts, however, the movable reflective layer does not relax completely until the voltage drops below 2 volts. Thus, a range of voltage, approximately 3 to 7 volts, in this example, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about, in this example, 10 volts, and pixels that are to be relaxed are exposed to a voltage difference of near zero volts. After addressing, the pixels can be exposed to a steady state or bias voltage difference of approximately 5 volts in this example, such that they remain in the previous strobing state. In this example, after being addressed, each pixel sees a potential difference within the "stability window" of about 3-7 volts. This hysteresis property feature enables the pixel design, such as that illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator pixels (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which produce the same polarity potential difference across the modulators. In some other implementations, signals can be used which alternate the polarity of the potential difference of the modulators from time to time. Alternation of the polarity across the modulators (that is, alternation of the polarity of write procedures) may reduce or inhibit charge accumulation which could occur after repeated write operations of a single polarity.

Figure 5A:
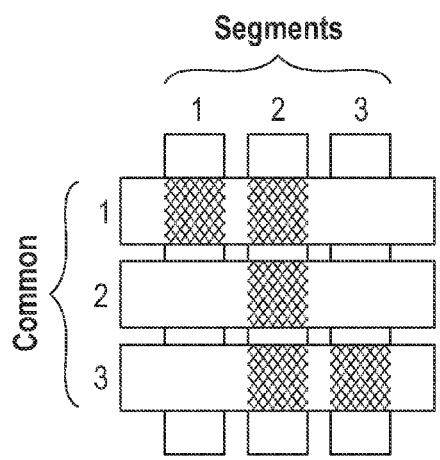
FIG. 5A shows an example of a diagram illustrating a frame of display data in the 3×3 interferometric modulator display of FIG. 2.
Figure 5B:
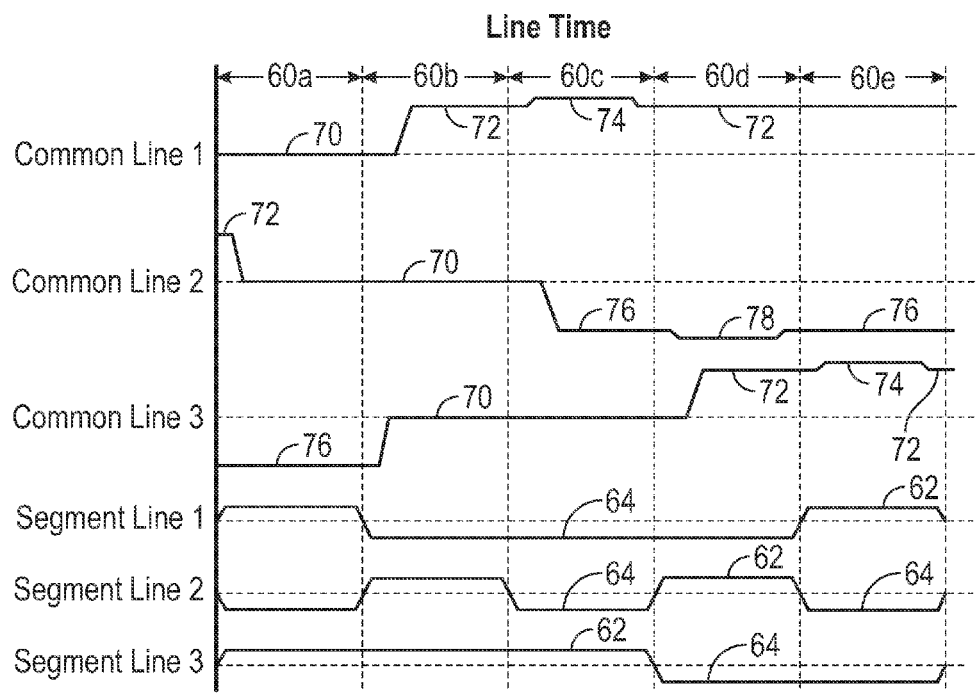
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to a 3×3 array, similar to the array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, for example, a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
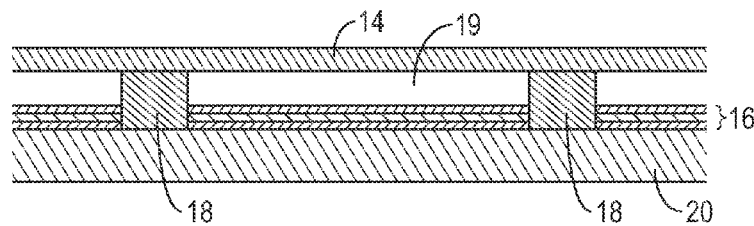
FIG. 6A shows an example of a partial cross-section of the interferometric modulator display of FIG. 1.
Figure 6B:
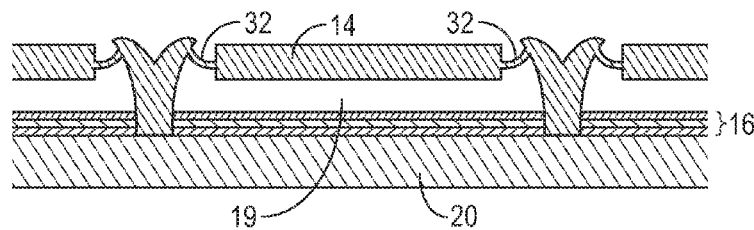
FIGS. 6B-6E show examples of cross-sections of varying implementations of interferometric modulators.
Figure 6C:
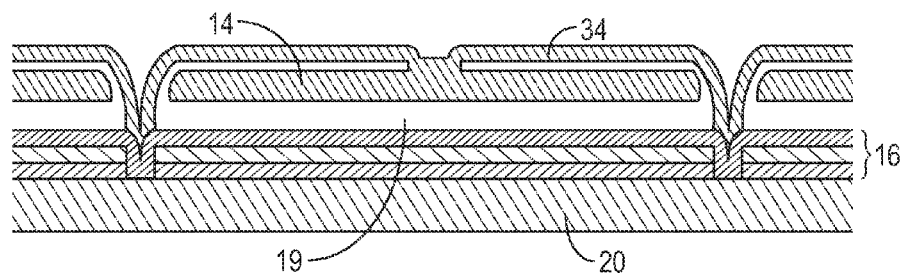

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
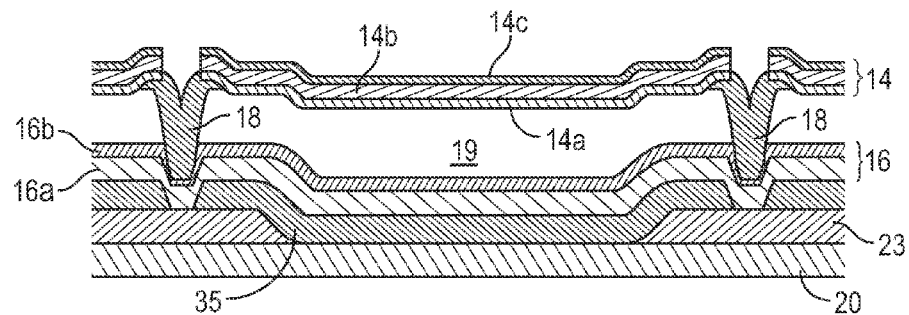

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, for example, an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (for example, between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoromethane ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
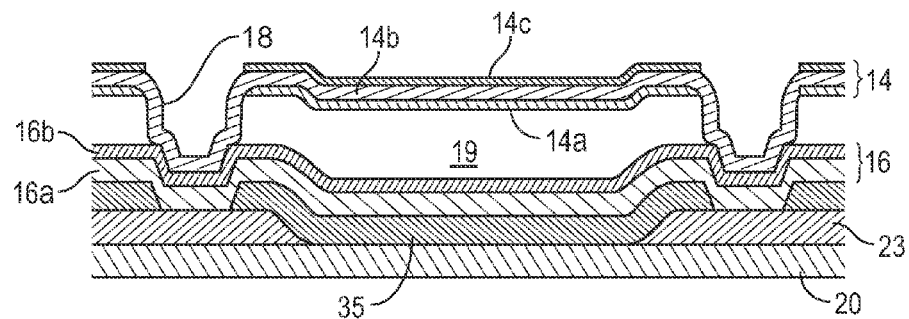

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer. In some implementations, the optical absorber 16a is an order of magnitude (ten times or more) thinner than the movable reflective layer 14. In some implementations, optical absorber 16a is thinner than reflective sub-layer 14a.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, for example, patterning.

Figure 7:
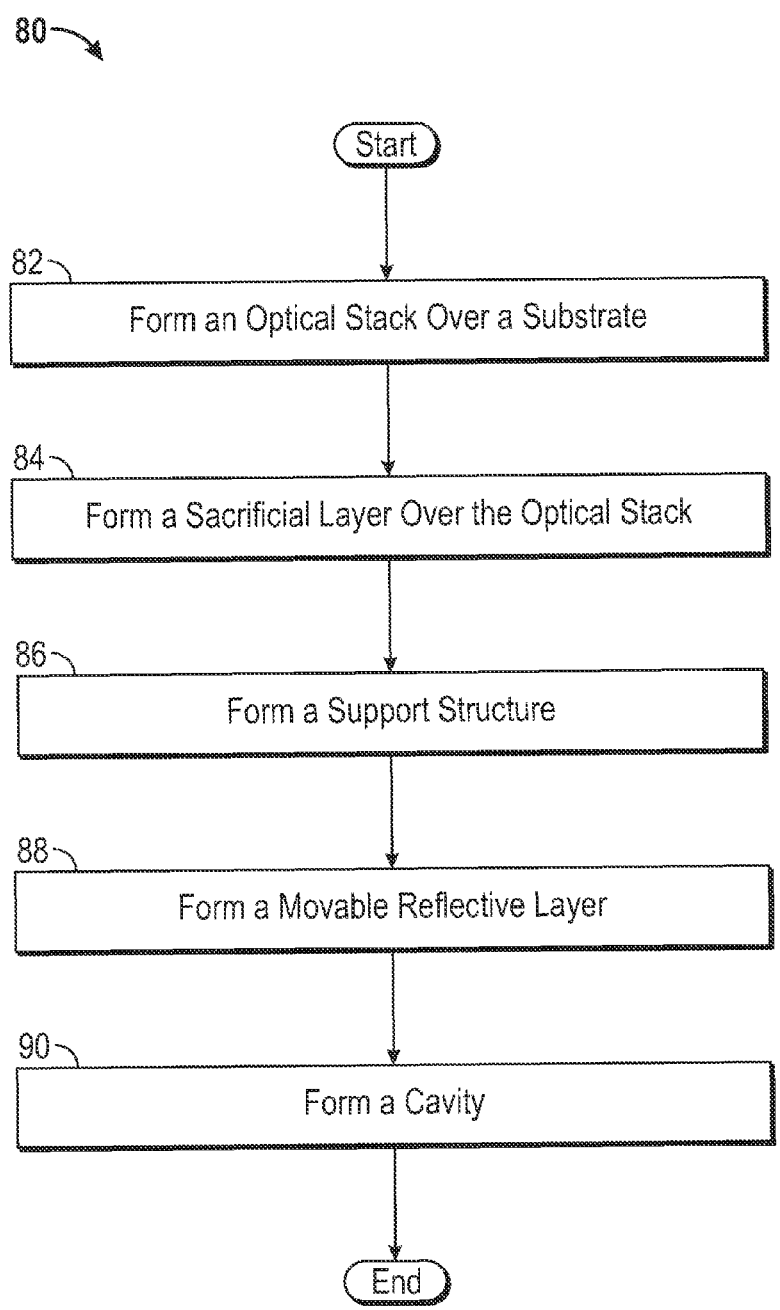
FIG. 7 shows an example of a flow diagram illustrating a manufacturing process for an interferometric modulator.
Figure 8A:
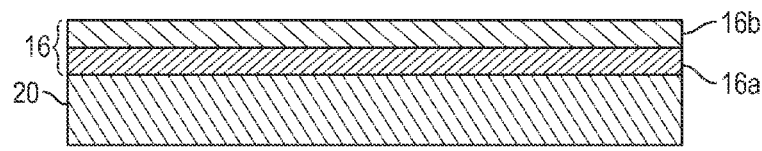
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture an electromechanical systems device such as interferometric modulators of the general type illustrated in FIGS. 1 and 6. The manufacture of an electromechanical systems device can also include other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, such as cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and electrically conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (for example, one or more reflective and/or conductive layers). In addition, the optical stack 16 can be patterned into individual and parallel strips that form the rows of the display. It is noted that FIGS.

8A-8E may not be drawn to scale. For example, in some implementations, one of the sub-layers of the optical stack, the optically absorptive layer, may be very thin, although sub-layers 16a, 16b are shown somewhat thick in FIGS. 8A-8E.

Figure 8B:
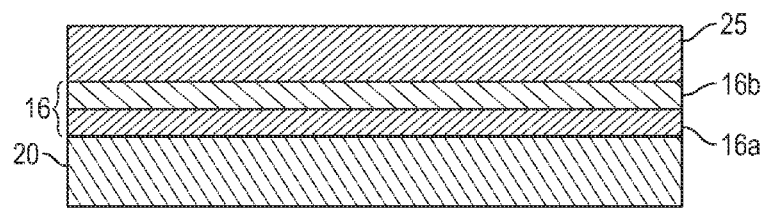

The process 80 continues at block 84 with the formation of a sacrificial layer 25 over the optical stack 16. The sacrificial layer 25 is later removed (for example, at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (a-Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, which includes many different techniques, such as sputtering), plasma-enhanced chemical vapor deposition (PECVD), thermal chemical vapor deposition (thermal CVD), or spin-coating.

Figure 8C:
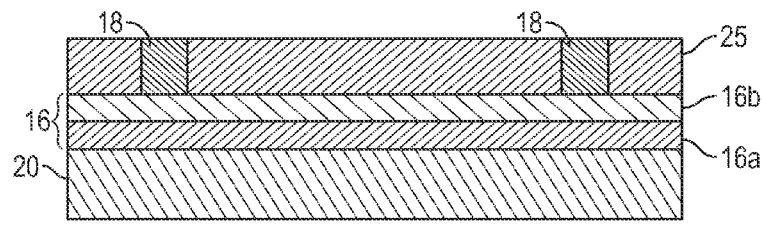

The process 80 continues at block 86 with the formation of a support structure such as post 18, illustrated in FIGS. 1, 6 and 8C. The formation of the post 18 may include patterning the sacrificial layer 25 to form a support structure aperture, then depositing a material (such as a polymer or an inorganic material such as silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
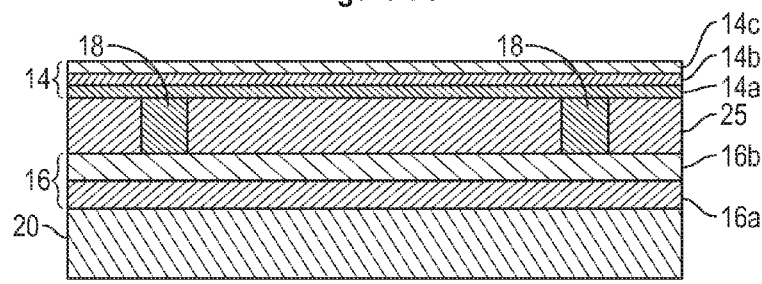
Figure 8E:
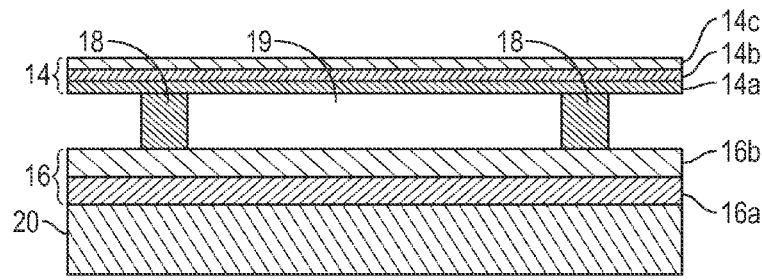

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps including, for example, reflective layer (such as aluminum, aluminum alloy, or other reflective layer) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, such as cavity 19 illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, by exposing the sacrificial layer 25 to a gaseous or vaporous etchant, such as vapors derived from solid $XeF_2$, for a period of time that is effective to remove the desired amount of material. The sacrificial material is typically selectively removed relative to the structures surrounding the cavity 19. Other etching methods, such as wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Display devices including a plurality of reflective display elements similar to the devices described above can rely on ambient lighting in daylight or well-lit environments for illuminating the display elements. In addition, an internal source of illumination (for example, a front illuminator) can be provided for illuminating the display elements in dark ambient environments. Ambient light or light from the additional source of illumination that is incident on the display device can be specularly reflected from various parts of the display device. For example, the light incident on the display device can be specularly reflected by the display cover. As another example, the light incident on the display device can be specularly reflected by the reflective display elements. In some implementations, the viewing direction in which the modulated light is brightest can substantially coincide with the direction in which light is specularly reflected. The glare resulting from the specularly reflected light can affect the brightness or the contrast ratio of the modulated light. Diffusers that can shift the direction of propagation of the light modulated by the display elements away from the direction in which the incident light is specularly reflected can be useful in reducing or eliminating the coincidence between the direction in which the modulated light is brightest and the direction in which light is specularly reflected and can improve the brightness and contrast ratio of display devices. The implementations described herein include diffusers having forward scattering profiles that can be used to reduce or eliminate the coincidence between the direction of propagation of the modulated light from the display device and the direction of propagation of light specularly reflected from various parts of the display device to reduce, mitigate and/or eliminate glare from the incident light that is specularly reflected from various portions of the display device not limited to the display cover, the display elements and any other partially reflecting surfaces or interfaces of the display device.

Figure 9:
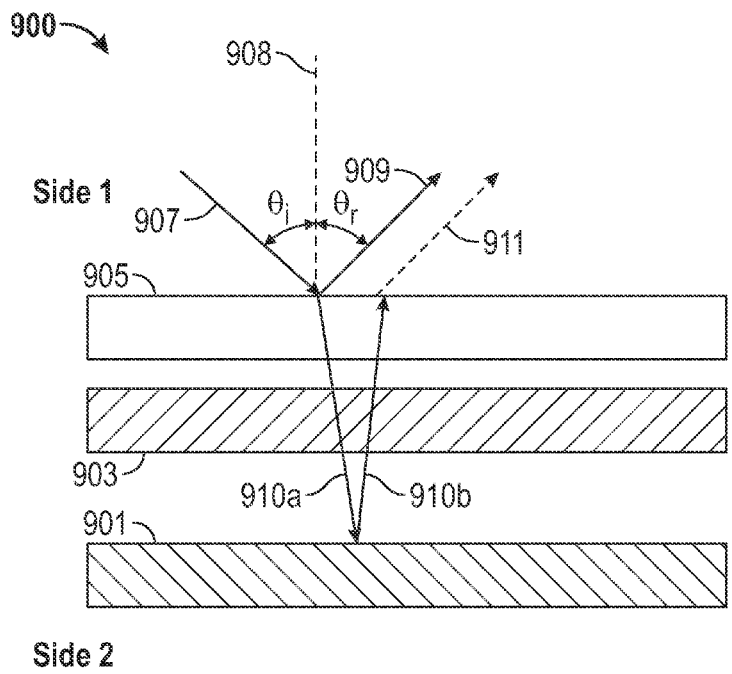
FIG. 9 illustrates an implementation of a reflective display device with light incident from an incidence direction being reflected along a direction of specular reflection that is associated with the incidence direction.

FIG. 9 illustrates an implementation of a reflective display device 900 with light incident from an incidence direction 907 being reflected along a direction of specular reflection 909 that is associated with the incidence direction 907. For example, from geometrical optics the direction of specular reflection 909 can be associated with the incidence direction 907 such that, relative to surface normal 908, the angle of incidence $\theta_i$ is equal to the angle of reflection $\theta_r$. The reflective display device 900 illustrated in FIG. 9 includes a plurality of reflective display elements 901. The display elements 901 can include various implementations of the interferometric modulators discussed above. The display device 900 can optionally include one or more layers 903 and 905 such as a diffuser, a display cover, one or more optical filters, anti-reflection layers, and/or other optical layers.

The display device 900 has a front side (side 1 of FIG. 9) and a back side (side 2 of FIG. 9). A portion of the light from a source disposed on the front side of the display device 900 that is incident along the incidence direction 907 can be specularly reflected by various parts of the display device 900 (for example, the reflective display elements 901 and/or the plurality of layers 903 and 905) along the direction of specular reflection 909. A portion of the light, represented by ray 910a, that is not specularly reflected is modulated by the display device 900 and reflected or scattered towards the front side of the display device, as represented by ray 910b. In various implementations, a large portion of the modulated light is reflected or scattered along a direction 911 which is parallel to (or coincides with) the direction of specular reflection 909 as shown in FIG. 9. In some implementations, to separate modulated light 910b from light that is reflected along the direction of specular reflection 909, a conventional diffuser can be used to spread or diffuse the modulated light 910b into a cone. In such implementations, the display can be viewed along a direction away from the direction of specular reflection 909. The conventional diffuser and consequently the display device 900 can have a maximum forward scattering along the direction of specular reflection 909 such that the display device 900 appears the brightest when viewed along the direction of specular reflection 909. However, light which is specularly reflected from the upper layers of the device can degrade the contrast ratio of the display device 900 as discussed below with reference to FIG. 10.

Figure 10:
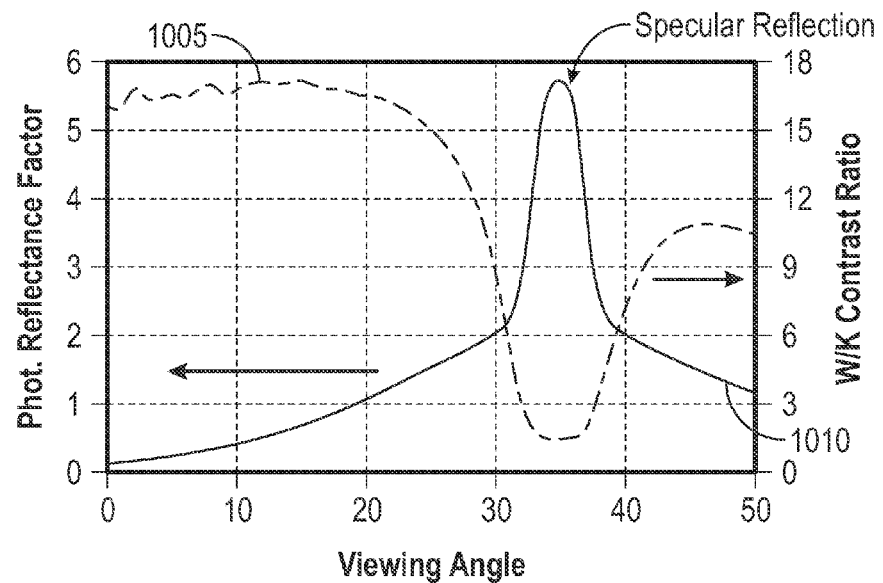
FIG. 10 illustrates the reflectance and contrast ratio of an implementation of a reflective display device as a function of the viewing angle.

FIG. 10 illustrates the reflectance and contrast ratio of an implementation of a reflective display device as a function of the viewing angle with a direct light incident from the left of a normal to a surface of the display device at approximately 35 degree with respect to the normal. The reflective display device can be similar to the reflective display device 900 discussed above that contains a conventional diffuser. The viewing angle can be measured relative to a normal to the front surface of the display device (for example, the normal 908 shown in FIG. 9). Reflectance of the reflective display device is indicated by the reflectance curve 1010. The reflectance curve 1010 can provide a measure of the amount of light when the reflective display device is viewed at various viewing angles and can be obtained by measuring the amount of light reflected and scattered by the reflective display device that has a conventional diffuser along different directions. In FIG. 10, the amount of light reflected by the reflective display device was measured when the reflective display device was off to obtain the reflectance curve 1010. Contrast ratio of the display device is indicated by curve 1005. In various implementations, the contrast ratio curve 1005 can be obtained by determining a ratio of the brightest color (for example, white) and the darkest color (for example, black) as the reflective display device is viewed along different viewing angles.

In FIG. 10, the peak of the reflectance curve 1010 coincides with the specular reflection angle of the display, i.e., 35 degree with respect to the display normal. Also, the peak of the reflectance curve 1010 coincides with the angle at which the contrast ratio curve 1005 decreases to a minimum. This effect can be partly attributed to the coincidence of the peak of the reflectance curve 1010 with the specular reflection angle, because the specularly reflected light combines with the light modulated by the display device and increases the luminance of the black state, and as a result, it reduces the contrast of the image produced by the display device. It is also observed from FIG. 10 that the peak of the contrast ratio curve 1005 occurs when the reflective display device is viewed from an angle of between approximately 0 degrees with respect to the normal to the front surface of the display device and approximately 20 to 25 degrees with respect to the normal to front the surface of the display device. The peak in the contrast ratio curve 1005 can be attributed partially to the reduction in the specular reflectance from the display device as observed from the reflectance curve 1010. It can be generally inferred from the example reflectance and contrast curves 1010 and 1005 in FIG. 10 that the contrast ratio of the display device decreases when the viewing angle is closer to the specular angle which can be attributed to an increase in the specular reflectance of the display device. Thus, when the viewing angle of the display device coincides with the direction along which incident light is specularly reflected, the contrast ratio of the display device can degrade significantly. Accordingly, it is desirable to reduce the glare due to specular reflection such that the display device can be viewed along a direction which corresponds to the maximum brightness without degrading the contrast ratio.

Various implementations of a reflective display device are provided with a diffuser so that the display can be viewed away from the specular direction. In various implementations, the display device provided with a conventional diffuser can include antireflection coatings to reduce specular reflection. However, conventional diffusers typically scatter incoming light in a cone-like region that includes and surrounds the direction along which light is specularly reflected. The angular width of this cone-like region is typically less than about 10 degrees. For example, the diffused light angular width at half the maximum light intensity is about 9 degrees when the light passes through a Gaussian diffuser of haze 75; so that significant optical power remains near direction along which light is specularly reflected. Although antireflection coatings may be able to reduce the specular glare to a small degree, residual glare of the specularly reflected light can degrade the contrast ratio and/or desaturate colors displayed by the device.

Therefore, instead of using conventional diffusers, the display device can include one or more layers configured to shift away from the direction of the specular reflection the direction along which the modulated light has a maximum forward scattering. When the device is viewed from such a "shifted" direction, specularly reflected light may contribute insubstantially to the light perceived by the viewer, thereby reducing or eliminating glare from specular reflection. In such implementations, since the viewing angle along which the display appears the brightest does not coincide with the direction along which the light is specularly reflected, the display device can be optimized to provide enhanced brightness, increased contrast ratio, and improved color saturation. In various implementations, it may be advantageous if the direction along which the modulated light that has the maximum forward scattering is shifted by an angle in a range from about 10 degrees to about 30 degrees away from the direction of the specular reflection to reduce the amount of modulated light that is scattered in the direction of specular reflection and/or to increase the brightness and contrast ratio of the display device. This shifted angle can be larger than the cone angle provided by conventional diffusers (which as discussed above is typically less than about 10 degrees).

To provide the shifted viewing direction, various implementations described herein include a diffuser that has a scattering profile different from conventional diffusers. The diffuser has an annular forward scattering profile as illustrated in and described with reference to FIG. 11 and is referred to herein as an annular diffuser.

Figure 11:
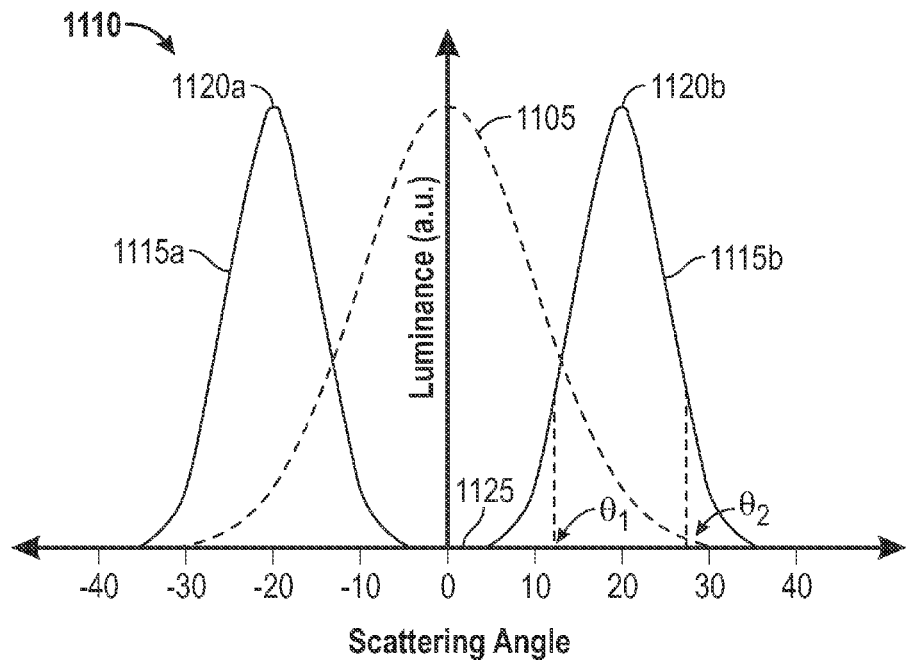
FIG. 11 illustrates the scattering profile of an implementation of a conventional diffuser and an implementation of an annular diffuser.

FIG. 11 illustrates the scattering profile of an implementation of a conventional diffuser and an implementation of an annular diffuser. If incoming light is considered to be incident at approximately 0 degrees with respect to a normal to the surface of an implementation of a conventional diffuser, then as discussed above, the incident light would be scattered in a cone-like region including and surrounding the direction along which light is specularly reflected which would also be at approximately 0 degrees with respect to the normal based on laws of reflections. The scattering profile of a conventional diffuser is shown by dotted line 1105. In FIG. 11, the full angular width of the light scattered by the conventional diffuser at half the maximum intensity is about 20 degrees. In contrast, light incident at approximately 0 degrees with respect to a normal to the surface of an implementation of an annular diffuser is scattered into an annular, ring shaped region as shown by the scattering profile 1110, represented by solid lines.

The scattering profile 1110 includes two lobes 1115a and 1115b indicating the annular, ring-shaped region. The scattering profile of the annular diffuser includes a dark region 1125 between the two lobes 1115a and 1115b which immediately surrounds the direction along which light is specularly reflected. The two lobes 1115a and 1115b can be symmetric. Alternately, in some implementations of the annular diffuser, the two lobes 1115a and 1115b can be asymmetric. The scattering profile 1110 can include peaks 1120a and 1120b which correspond to regions that are brightest or have maximum light intensity. Although, FIG. 11 shows the light intensity in the dark region 1125 as approximately 0, in other implementations of the annular diffuser, the light intensity in the dark region 1125 may be a fraction of the maximum light intensity. In various implementations, the light intensity in the dark region 1125 can be ½, ¼$^{th}$, ⅛$^{th}$, ⅒$^{th}$, etc. of the maximum light intensity in the peak 1120a and 1120b of the scattering profile.

As shown in FIG. 11, the dark region 1125 in the scattering profile of the annular diffuser can have a full angular width, $2\theta_1$ and bright annular, ring-shaped region can have an angular width, $\theta_2 - \theta_1$. The angles $\theta_2$ and $\theta_1$ can correspond to the scattering angles at which the light intensity is ½, ¼$^{th}$, ⅛$^{th}$, ⅒$^{th}$, etc., of the maximum light intensity in the peak 1120a and 1120b of the scattering profile. In various implementations, $\theta_1$ can have a value between approximately 5 degrees and 15 degrees and $\theta_2$ can have a value between approximately 10 degrees and 30 degrees such that the value of $\theta_2 - \theta_1$ is greater than approximately 5 degrees.

Figure 12A:
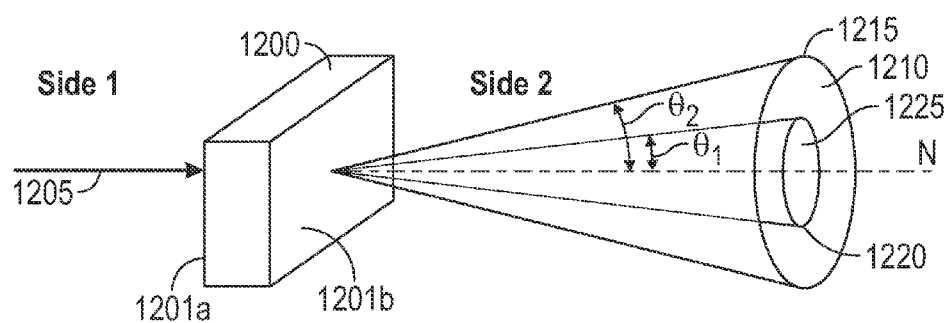
FIG. 12A illustrates an implementation of a diffuser with a forward scattering profile that is annular.

FIG. 12A illustrates an implementation of a diffuser 1200 with a forward scattering profile that is annular. For example, the diffuser 1200 can have the scattering profile 1110 (shown by solid lines) illustrated in FIG. 11. The diffuser 1200 has a first surface 1201a and a second surface 1201b. The diffuser 1200 is configured to scatter light incident from a first side of the diffuser (side 1 of FIG. 12A) along an incidence direction 1205 on the first surface 1201a in an annulus 1210 around a surface normal N on the second side (side 2 of FIG. 12A) of the diffuser 1200. The annular, ring-shaped region 1210 is between a first region 1215 having an angle $\theta_2$ with respect to the surface normal N and a second region 1220 having an angle $\theta_1$ with respect to the surface normal N. Accordingly, the angular width of the annulus 1210 is given by $\theta_2 - \theta_1$. As discussed above, in various implementations, $\theta_1$ can have a value between approximately 5 degrees and 15 degrees and $\theta_2$ can have a value between approximately 10 degrees and 30 degrees such that the value of $\theta_2 - \theta_1$ is greater than approximately 5 degrees. The first and second regions 1215 and 1220 can be circular, elliptical or have some other shape. A conical region 1225 along the surface normal N and enclosed by the annulus 1210 is relatively dark compared to the annulus 1210, because the diffuser 1200 scatters light away from the normal N and into the annulus 1210. Various implementations of the annular diffuser 1200 can be provided in the display device 900 as further discussed below.

Figure 12B:
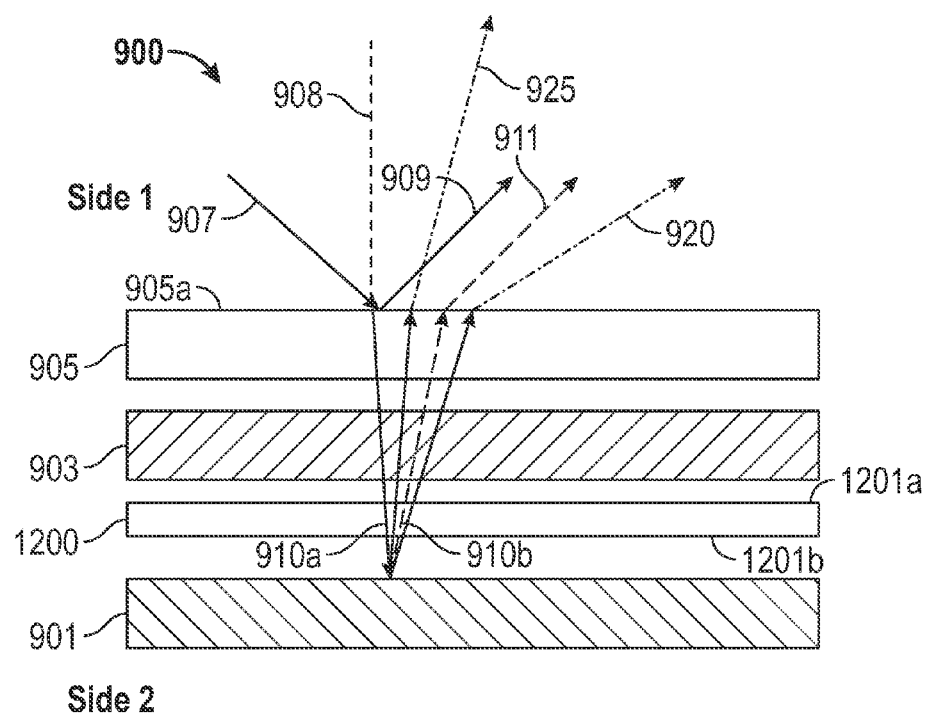
FIG. 12B illustrates an implementation of a reflective display device provided with the annular diffuser illustrated in FIG. 12A.

FIG. 12B illustrates an implementation of a reflective display device 900 provided with the annular diffuser 1200 illustrated in FIG. 12A. The display device 900 can be generally similar to the display device 40 described with reference to FIGS. 17A and 17B below. As shown in FIG. 12B, incident light incident from an incidence direction 907 will be specularly reflected along a specular direction 909. Generally the reflected ray will travel at an angle that is equal to the incidence angle but on an opposite side of the normal 908 to the surface 905a. Modulated light reflected from the display elements carrying image data, without annular diffuser 1200, would have been directed along ray 911 (shown as a dashed line), which coincides with or is parallel to the direction of specular reflection 909. Instead, the modulated light is directed in an annular region defined by the illustrated single rays 920 and 925 falling within the annulus 1210 described with reference to FIG. 12A due to the presence of the annular diffuser 1200. Generally, in some implementations, as described in FIGS. 15A-15C, the central dark circle (conical region 1225 in FIG. 12A) formed by the diffuser 1200 can coincide with the direction of specular reflection 909 and ray 911. This is because, in some implementations, the center of the dark ring shifts approximately linearly with input angle, as described further below. In various implementations, the annular diffuser 1200 can be configured such that a dark region similar to the conic dark region of 1225 described with reference to FIG. 12A is produced along the direction 911 which coincides with or is parallel to the direction of specular reflection 909. The display device 900 can be viewed, for example, along the directions 920 or 925, which correspond to directions within the annulus 1210. In such implementations, the presence of the annular diffuser 1200 results in little optical power from the modulated light being scattered along the direction of specular reflection 909. In various implementations, when $2\theta_1$ is relatively large (for example, greater than approximately 10 degrees), the specular glare can be largely ignored, because the viewing directions 920, 925 are shifted away from the direction of specular reflection 909. In such implementations, the image produced by the display device advantageously can have an increased brightness and an increased contrast ratio as compared to a display device provided with a conventional diffuser or other optical elements that may affect the direction of the modulated light, but that maintain a maximum reflection in the direction of specular reflection 909 as illustrated by scattering profile 1105 in FIG. 11. In various implementations, the annular diffuser 1200 can be configured such that the display device can be viewed with comfortable angular tolerance and good uniformity. In various implementations, the range of viewing angles of the display device given by $(\theta_2 - \theta_1)$ can be between approximately 5 degrees and approximately 30 degrees with respect to the direction of specular reflection. As seen in FIG. 11, the annular diffuser 1200 can form two lobes that include display modulated, image containing light, and hence considering both lobes, one may say that the full range of viewing angles is given by $2(\theta_2 - \theta_1)$, which may be 10 to 60 degrees.

In various implementations, the annular diffuser 1200 can include optical features, such as, for example, lenses or holographic features (for example, a computer generated hologram). In various implementations, the optical features may be arranged in a random pattern on one or both surfaces of the diffuser 1200. In various implementations, the size of the optical features may be comparable to or smaller than the size of a display element. In implementations, where the size of the optical feature is comparable to the size of a display element, each optical features may be registered with each display element. In some implementations, the size of the optical features may be between approximately 1% to 50% of the size of the display element, which may reduce the appearance of Moire fringes. For example, there may be about 10 to 10,000 optical features per display element or pixel. In various implementations, the density of the optical features can be between approximately $10^5$ per $cm^2$ and approximately $10^9$ per $cm^2$.

One method of distributing incident light in an annulus is to use a plurality of axicon lenses. Without subscribing to any particular theory, an axicon includes a lens which has a conical surface. The axicon lens can include a rotationally symmetric prism. An axicon can image a point source as a line. An axicon lens can project a collimated beam of light (for example, a beam of light from a laser) as an annulus. Examples of axicon lenses and their light transmission properties are discussed in further detail below.

Figure 13A:
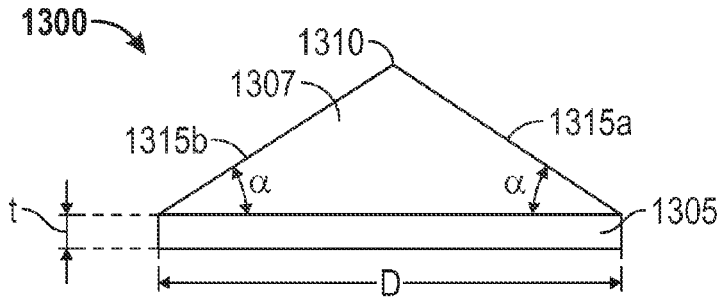
FIGS. 13A-13D are cross-section views of various implementations of an axicon.
Figure 13B:
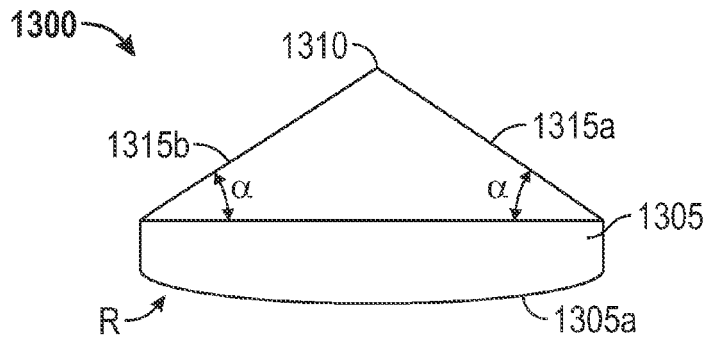
Figure 13C:
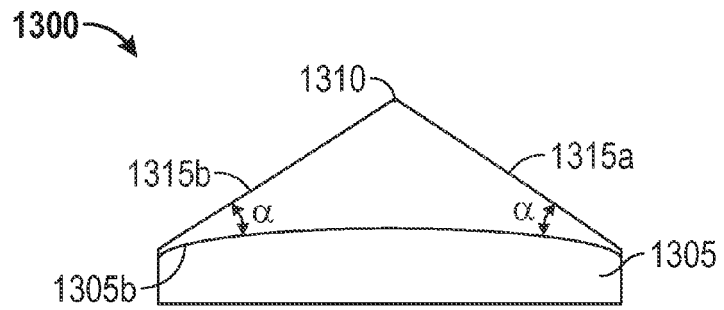
Figure 13D:
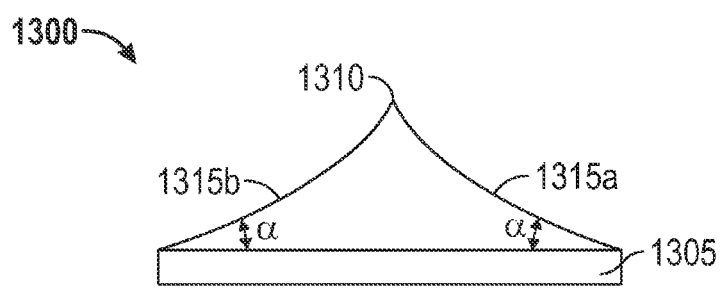

FIGS. 13A-13D are cross-section views of various implementations of an axicon 1300. The axicon 1300 illustrated in FIG. 13A is cone shaped and has a base 1305 and a conical region 1307 including an apex 1310 and sloping sidewalls 1315a and 1315b joining the base 1305 to the apex 1310. Each of the sloping sidewalls 1315a and 1315b can form an angle $\alpha$ with the base 1305. In various implementations, the sloping walls can be straight as shown in FIGS. 13A-13C. In some implementations, the sloping walls can be curved. For example, as shown in FIG. 13D, the sloping walls 1315a can be concave. In other implementations, the sloping walls 1315a can be convex. In various implementations, one or more surfaces of the base 1305 can be curved. For example, as shown in FIG. 13B a surface 1305a of the base 1305 that is farther from the apex 1310 is convex. As another example, the surface 1305a of the base can be concave. As another example, as shown in FIG. 13C, a surface 1305b of the base 1305 that is closer to the apex 1310 is concave. As yet another example, the surface 1305b of the base 1305 can be convex. In various implementations, the base 1305 can include a material having a refractive index that is different from the refractive index of the material included in the conical region 1307.

In various implementations, the angle $\alpha$ can be between approximately 10 degrees to approximately 40 degrees. By geometric principles, the axicon apex angle at the apex 1310 is $180-2\alpha$ degrees. In various implementations, the base 1305 can have a circular cross-section having a diameter D. As discussed above, in some implementations one or both the surfaces of the base 1305 may be curved having a radius of curvature R. In various implementations, the radius of curvature R of the curved surfaces of the base 1305 may be very large as compared to the diameter D of the base 1305 or the size of the axicon 1300 such that the surfaces of the base 1305 may be considered to be relatively flat. Light incident on the various implementations of the axicon 1300 illustrated in FIGS. 13A-13D is forward scattered in an annulus similar to the annulus 1210 discussed above with reference to FIG. 12A. In various implementations, the radius of curvature R and the diameter D of the base 1305 can be chosen such that the angular width of the annulus $(\theta_2-\theta_1)$ produced by the axicon 1300 is between about 5 to 30 degrees. When the diameter D is large relative to the wavelength of incoming light, for example when diameter D is 10 times or greater than the largest appreciable component of the spectrum of incoming light, then refraction effects will dominate. In such a regime, generally, the angular width of the annulus $(\theta_2-\theta_1)$ can be influenced by the radius of curvature R of one or more of the base 1305 and the sloping sidewalls 1315a and 1315b. For example, when all surfaces are flat, then the angular width of the annulus, in some implementations, can be very small, for example, approximately zero, and the axicon 1300 will form a narrow bright ring with little to no angular width. When one or more of the base 1305 and the sloping sidewalls 1315a and 1315b are curved, then the angular width of the annulus $(\theta_2-\theta_1)$ may be appreciable, and may be, in various implementations, between about 5 to 30 degrees.

In various other implementations, for example where the diameter D of the base 1305 is roughly similar in size relative to the wavelength of incoming light, for example when diameter D is less than ten times the largest appreciable component of the spectrum of incoming light and greater than one tenth the smallest appreciable component of the spectrum of incoming light, then both refraction and diffraction effects produced by the axicon 1300 may contribute to the shape of the annular ring shaped region produced by the axicon 1300. For example, in such a regime where diameter D is small, with all surfaces of the axicon 1300 flat, the angular width of the annular region produced by the axicon 1330 may primarily result from diffraction and may be approximately 5 degrees when the diameter D of the base is approximately 6 µm. In some other such implementations, one or more surfaces of the base 1305 can be curved, and both diffraction and refraction can contribute significantly to the angular width such that an angular width of the annulus shaped region $(\theta_2-\theta_1)$ is larger than 5 degrees. Accordingly, both the radius of curvature of the surfaces and the size of the axicon can be selected to provide for a desired angular width of the annular ring shaped region. In various implementations, the cross-section of the base 1305 can be elliptical or polygonal instead of circular. The base 1305 can be characterized by a thickness t. In various implementations, the thickness t can be approximately $10^{-3}$ cm or less.

Figure 14A:
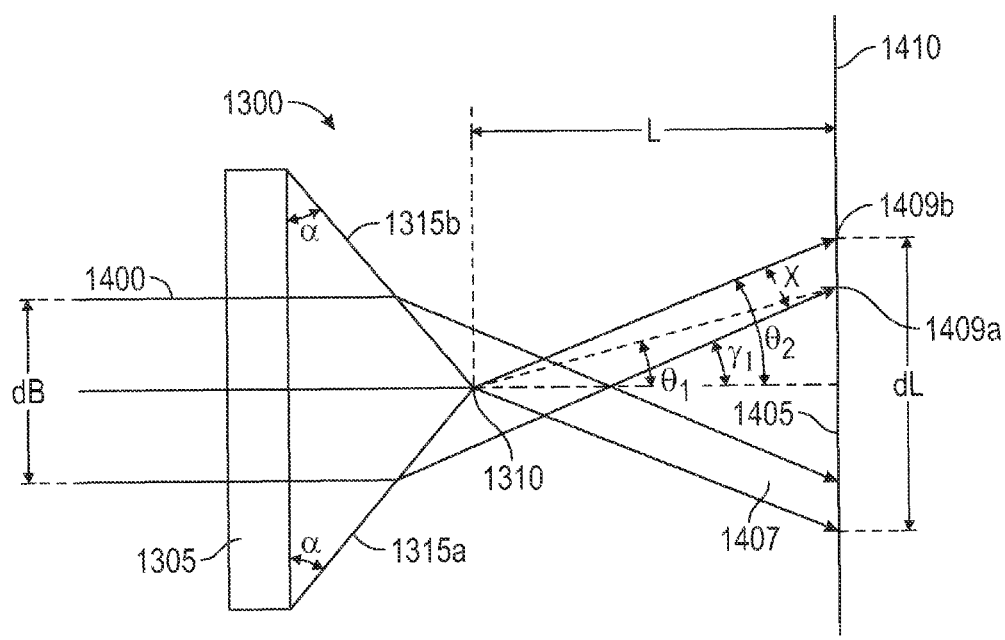
FIG. 14A illustrates the effect of an axicon on a collimated beam as it propagates through the axicon.

FIG. 14A illustrates the effect of an axicon on a collimated beam as it propagates through the axicon. A beam of light 1400 having a beam diameter db that is incident on the base 1305 of the axicon 1300 is projected onto the plane 1410 at a distance L from the apex 1310 of the axicon 1300 as a ring shaped region having an outer diameter dL. The ring shaped region includes a central dark portion 1405 and a bright annulus 1407. The annulus 1407 can be similar to the annulus 1210 discussed above with reference to FIG. 12A. The inner edge 1409a of the annulus 1407 subtends an angle $\theta_1$ at the apex of the axicon 1310. The outer edge 1409b of the annulus 1407 subtends an angle $\theta_2$ at the apex of the axicon 1310. The annulus 1407 produced by the axicon 1300 has a thickness x. The diameter of the annulus 1210 is proportional to the distance L of the image plane 1410 from the axicon 1300. For example, if the distance of the image plane 1410 increases, the diameter dL of the ring shaped region also increases. A portion of the beam of light 1400 that is incident on the sloping sidewall 1315b is refracted by the sloping sidewall such that it forms an angle $\gamma_1$ with respect to an optical axis that passes through the apex of the axicon 1300. In the illustrated implementation, the thickness of the annulus 1210, x, remains constant as the distance L of the image plane 1410 is varied when diffraction is not considered and $\gamma_1=\theta_2$. The diameter dL of the ring shaped region can be calculated using the formula dL=2 L tan [(n−1)α], where n is the refractive index of the material of the axicon. The thickness x of the ring can be calculated using the formula x=db cos(α+γ$_1$)/2 cos α.

In those implementations of axicon 1300 in which all the surfaces are flat, the angles γ$_1$ and θ$_2$ are equal to each other and can be referred to by a common angle γ. In such implementations, γ is related to the angle α and the refractive index 'n' of the material of the axicon and can be calculated by the formula γ=sin$^{-1}$(n sin α)−α. In such implementations, the thickness x of the ring can be calculated using the formula x=db cos(α+γ)/2 cos α. As can be seen from this formula, when dimension db is very small, the dimensions of x will also be very small, and hence, for an axicon 1300 with flat surfaces as illustrated, the annular ring will be very thin and the angular width (θ$_2$−θ$_1$) will be negligible, the annular ring therefore being a thin line. Furthermore, it is understood that, in various implementations, far away from the axicon 1300 (that is, when L is very large compared to db) γ$_1$≈θ$_1$.

Figure 14B:
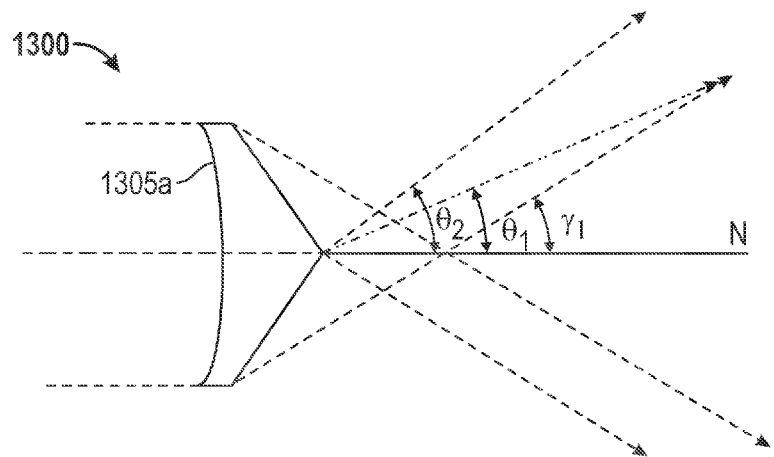
FIGS. 14B-14C illustrate the ray-diverging property of implementations of an axicon having curved surfaces.
Figure 14C:
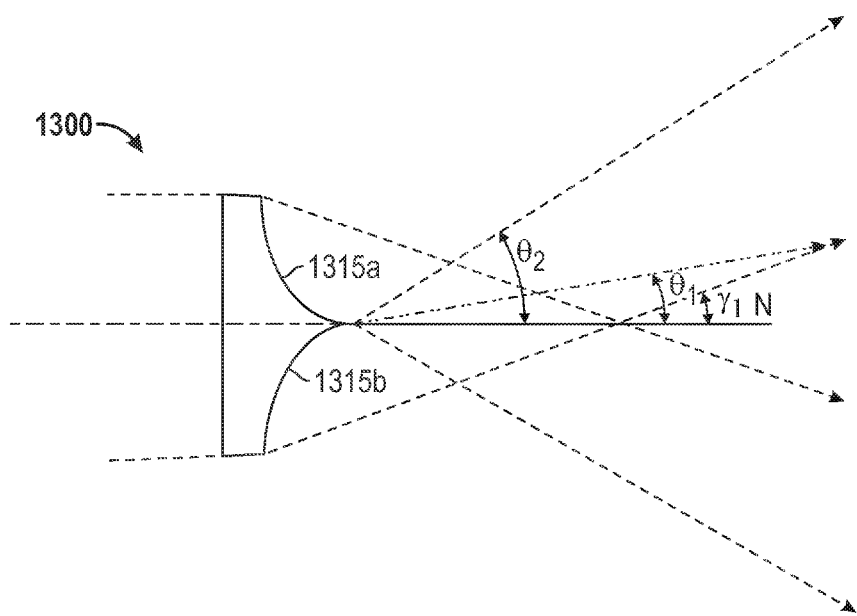

FIGS. 14B-14C illustrate the ray-diverging property of implementations of an axicon having curved surfaces. FIG. 14B illustrates the ray-diverging property of an implementation of an axicon having a surface of the base that is curved similar to the implementation illustrated in FIG. 13C. Due to the concavity of the curved surface of the base, the axicon 1300 illustrated in FIG. 14B functions as a diverging or negative lens resulting in θ$_2$>γ$_1$. FIG. 14C illustrates the ray-diverging property of an implementation of an axicon having curved sidewalls similar to the implementation illustrated in FIG. 13D. In some implementations of an axicon having curved sidewalls, the angle θ$_2$ can be greater than the γ$_1$. Furthermore, as can be seen from FIGS. 14B and 14C, at very large distances away from the axicon, γ$_1$≈θ$_1$. When the axicon is on order of the size of a pixel in a display device, or smaller, most normal viewing distances would be considered very far from the axicon.

As discussed above, the axicon redistributes the incident light in an annulus such that the intensity of light in the direction of incident light (or the direction along which incident light is specularly reflected) is minimum. Without subscribing to any particular theory, the diffusion characteristics of various implementations of an axicon are approximately independent of the angle at which light is incident on a display device or the axicon in the sense that, as the angle of incidence of ambient light onto the display surface (as well as the angle of the specular reflection) shifts away from normal, the dark circle in the center of the annulus shown in FIG. 12A (conical region 1225) also shifts so that the specular reflection angle remains within the dark circle. This is because the center of the dark ring shifts approximately linearly from normal with incidence angle upon the axicon, and as illustrated in FIG. 12B, the light incident upon annular diffuser 1200 is along the specular reflection direction by virtue of its reflection from display elements 901. For example, light incident at about 0 degrees with respect to a normal to the base of the axicon and light incident at about 35 degrees with respect to the normal to the base of the axicon would both generate annular shaped regions with minimum energy (or intensity) in the direction of the incident light (or the direction along which incident light is specularly reflected). Hence, when light is incident at approximately 0 degrees from normal on the base of the axicon, the dark circle generated by the axicon is also centered at approximate 0 degrees from normal. Similarly, the annulus generated by the axicon when illuminated by light incident at about 35 degrees with respect to the normal to the base of the axicon includes a dark circle that is approximately centered at about 35 degrees with respect to the normal to the base of the axicon. This is explained in greater detail with reference to FIGS. 15A-15C.

Figure 15A:
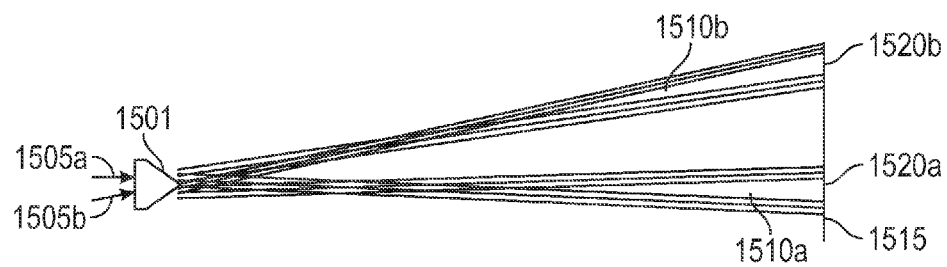
FIGS. 15A-15C illustrate simulation results for various implementations of an axicon.
Figure 15B:
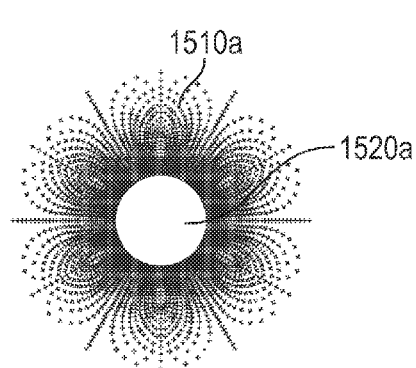
Figure 15C:
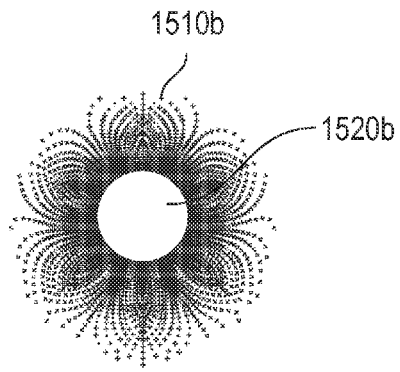

FIGS. 15A-15C illustrate simulation results for various implementations of an axicon. FIG. 15A shows the simulation results of the light output by an implementation of an axicon. The simulation results were obtained by a ray tracing software (for example, ZEMAX optical design software available from Radiant Zemax, LLC, Redmond, Wash.). For the purpose of simulation an implementation of an axicon 1501 having a base with diameter 10 mm and an apex angle of approximately 3 degrees was considered, and all surfaces are flat. Light rays 1505a (illustrated as a single ray for ease of illustration) incident at approximately 0 degrees with respect to the optical axis of the axicon 1501 and light rays 1505b (illustrated as a single ray for ease of illustration) incident at approximately 10 degrees with respect to the optical axis were projected on an observation plane 1515 which was located approximately 250 mm from the axicon lens 1501. As observed from FIG. 15A, the incident light rays 1505a are projected by the axicon 1501 as an annulus 1510a, which appears on the observation plane 1515 as a bright ring 1510a surrounding a dark central region 1520a. Since incident light rays 1505a were incident at 0 degrees from normal, the center of the dark central region 1520a is also approximately at 0 degrees from the center of the axicon 1501. The incident light rays 1505b are projected by the axicon lens 1501 as an annulus 1510b, which appears on the observation plane 1515 as a ring 1510b surrounding a dark central region 1520b. The simulated full angular width of the dark central regions 1520a and 1520b is approximately 3 degrees. As further discussed below, various properties of the annulus projected by the axicon lens depend, at least partially, on the geometry of the axicon lens. For example, the angular width of the dark central regions and/or the angular width of the outer surface of the annulus can be varied by varying the geometry of the axicon.

FIG. 15B shows the simulated light intensity pattern at the observation plane 1515 for rays of light 1505a that are incident at approximately 0 degrees with respect to the optical axis of the axicon 1501. The simulated light intensity pattern illustrates the central dark region 1520a surrounded by the ring 1510a. FIG. 15C shows the simulated light intensity pattern at the observation plane 1515 for rays of light 1505b that are incident at approximately 10 degrees with respect to the optical axis of the axicon 1501. The simulated light intensity pattern illustrates the central dark region 1520b surrounded by the ring 1510b. The light intensity pattern in FIG. 15C is shifted (as compared to the pattern shown in FIG. 15B) consistent with the 10 degree incident angle. That is the center of the central dark region 1520b is shifted by about 10 degrees (simulation shows that center of central dark region is not exactly 10 degrees, but is about ~0.35 degrees off from 10 degrees) from a normal to the axicon base going through the center of the axicon. As a result, it can be said that the location of the center of the dark circle shifts roughly linearly with input angle. It is also observed from FIGS. 15B and 15C that the dark central region 1520a and the dark central region 1520b have approximately the same angular extent (of approximately 3 degrees across the full vertex of the inner cone) though, the ring 1510b surrounding the central dark region 1520b is slightly asymmetric as compared to the ring 1510a surrounding the central dark region 1520a. It can be inferred from FIGS. 15B and 15C that there will be very little optical energy inside the central dark regions 1520a, 1520b for light incident on the axicon.

Since the axicon 1300 is configured to distribute incident light in an annular shaped region, various implementations of the annular diffuser 1200 can include a plurality of axicon lenses 1300. The plurality of axicon lenses 1300 can be disposed on one or both surfaces 1201a and 1201b of the diffuser 1200 or in the volume of the diffuser 1200 or partially on the surface and partially in the volume of the diffuser 1200. In various implementations, the plurality of axicon lenses 1300 can be disposed in a random array. In various implementations, the optical axis of each of the plurality of axicon lenses 1300 can be aligned along the surface normal of the annular diffuser 1200. In various implementations, the optical axis of each of the plurality of axicon lenses 1300 can be aligned at an angle with respect to the surface normal of the annular diffuser 1200.

With reference to the display device 900 shown in FIG. 12B, the axicon diffuser 1200 can be disposed over the plurality of display elements 901. In various implementations, one or both surfaces 1201a, 1201b of the diffuser 1200 include a plurality of axicon lenses 1300. For example, in some such implementations, the axicons are provided on one surface of the diffuser, and the diffuser 1200 can be oriented so that axicons are on the surface 1201a that is farther (distal) from the display elements 901 than the surface 1201b (proximal). Therefore, in such implementations, the bases 1305 of the plurality of axicon lenses 1300 are proximal to the display elements 901, and the apices of the plurality of axicon lenses 1300 are distal to the display elements 901. In other implementations, axicons can be provided, additionally or alternatively, on the surface 1201b. For example, in certain such implementations, the bases 1305 of some of the axicons 1300 are distal to the display elements 901 and the apices of the axicons are proximal to the display elements 901. As discussed above, the axicons can have a size that is comparable to or smaller than the size of a display element. In implementations, where the size of the axicons is comparable to the size of a display element, each axicon may be matched and/or aligned with a corresponding display element.

The geometry of the plurality of the axicons 1300 (for example, apex angle, radius of the base 1305, thickness t of the base 1305) can be determined such that the angle $\theta_1$ is between approximately 5 degrees and approximately 15 degrees and the angular width of the annulus 1210, given by $\theta_2 - \theta_1$, is between approximately 10 degrees to approximately 30 degrees.

In various implementations, it may be advantageous to curve the sloping sidewalls 1315a and 1315b and/or one or more surfaces 1305a and 1305b of the base of the axicon 1300, for example as shown in FIGS. 13B-13D. Simulation results have shown that curving one or more surfaces 1305a and 1305b of the base of the axicon 1300 can spread the light over a wider angle $\theta_2$, such that the annular width $\theta_2 - \theta_1$ of the annulus 1210 is increased. A wider annular width can increase the range of viewing angles of the display device. For example, since the display device 900 can be viewed along directions within the annulus that are diametrically opposed to each other (see, for example, viewing directions 920 and 925 in FIG. 12B), the range of viewing angles of the display device can be about $2(\theta_2 - \theta_1)$. In various implementations, the axicon angle α (and/or the apex angle) can be selected to provide a dark region having a desired angular width $2\theta_1$. The curvature of the one or more surfaces 1305a and 1305b of the axicon base 1305 may be selected to provide a desired angular width $\theta_2 - \theta_1$ of the annulus. Accordingly, in certain implementations, one or more geometrical properties of the axicons can be used to tune the optical properties of the diffuser to shift the direction of modulated light away from the specular direction so that relatively low specular glare and relatively high color contrast of the device are simultaneously achieved.

In various implementations, a second diffuser, for example a conventional diffuser (and/or antiglare coating), may be provided either forward or rearward of the annular diffuser to further spread the light to improve the aesthetics of the image on the display.

Figure 16:
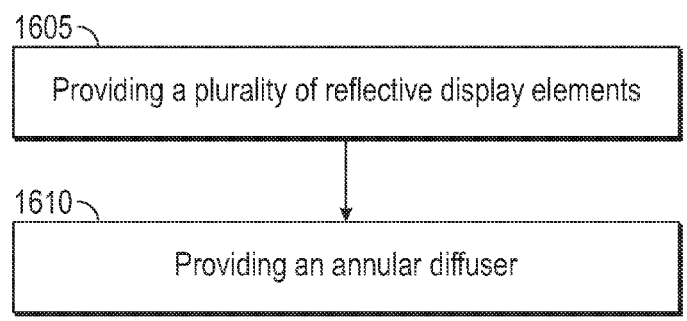
FIG. 16 is a flowchart illustrating an implementation of a method of manufacturing a display device including an annular diffuser.

FIG. 16 is a flowchart illustrating an implementation of a method of manufacturing a display device including an annular diffuser. The method includes providing a plurality of reflective display elements configured to modulate light incident on the display device as shown at block 1605 and providing a diffuser layer configured to distribute the modulated light in an annulus as shown at block 1610. The diffuser layer can be configured to redistribute light incident on the device such that the light reflected from the display elements is redistributed in a ring shaped region between a first circular region having a first angle $\theta_1$ with respect to the direction of specular reflection and a second circular region having a second angle $\theta_2$ with respect to the direction of specular reflection. The second angle $\theta_2$ can be larger than the first angle $\theta_1$, which can be greater than 0 degrees. In various implementations, the annular diffuser can be over the plurality of the display elements on the same side of the display elements as the side from which light is configured to be incident in the display device. In various implementations, the display elements can be disposed on a first side of a substrate. In various implementations, the annular diffuser can be disposed on a second side of the substrate which is opposite the first side of the substrate. In various implementations, the annular diffuser can be disposed on the same side of the substrate as the side on which the reflective display elements are disposed. In various implementations, the diffuser layer may be disposed between the substrate and the reflective display elements. In various implementations, the diffuser layer may be fabricated and/or disposed on the substrate prior to disposing the reflective display elements. In various implementations, the annular diffuser can be disposed using a pressure sensitive adhesive or can be laminated to the substrate. The annular diffuser can include optical features such as, for example, a plurality of axicon lenses or holographic features. The optical features can be formed by using a process such as, for example, embossing, imprinting, surface lithography, etc.

Certain implementations of the diffuser 1200 have been described with reference to a reflective display device 900. However, this is for convenience of presentation only and is not intended to be limiting. In other implementations, the diffuser 1200 can be used with transmissive or transflective display devices. Implementations of the diffuser layer 1200 can be used with other optical apparatus such as lighting devices, light guides, luminaries, and so forth.

Figure 17A:
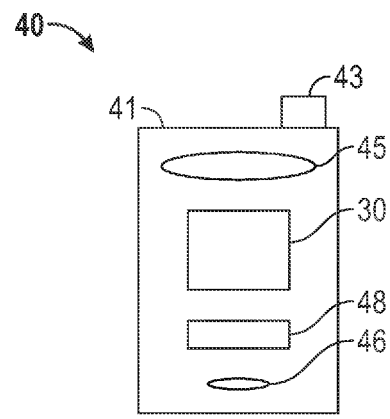
FIGS. 17A and 17B show examples of system block diagrams illustrating a display device that includes a plurality of interferometric modulators.
Figure 17B:
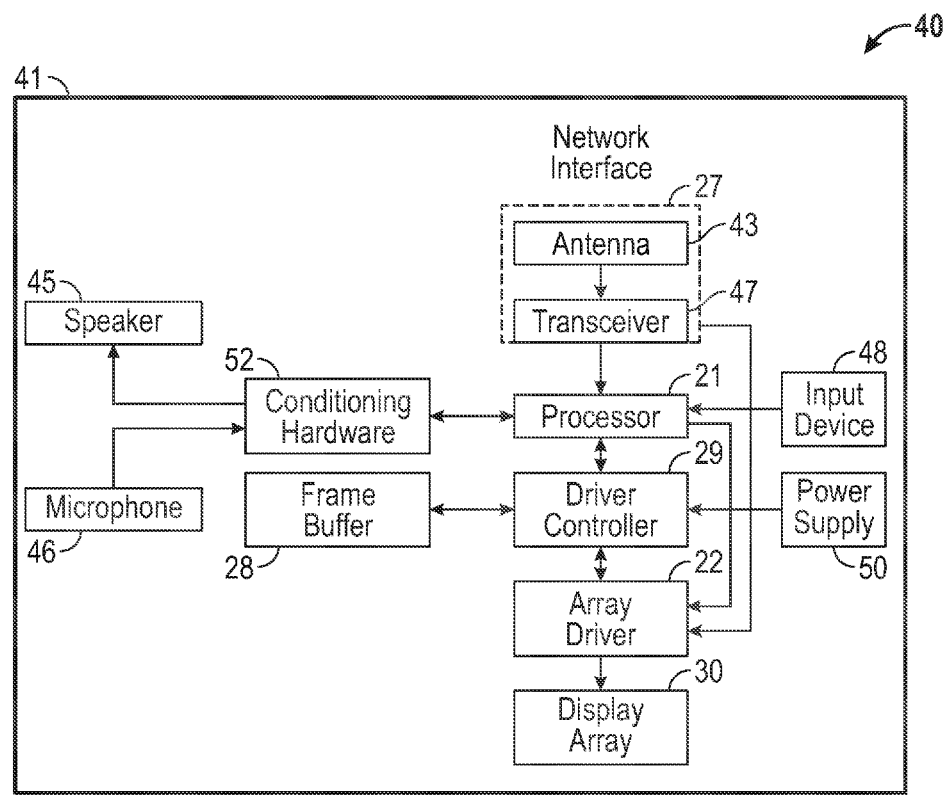

FIGS. 17A and 17B show examples of system block diagrams illustrating a display device 40 that includes a plurality of interferometric modulators. The display device 40 can be generally similar to implementations of the display device 900 described above. For example, the display device 40 can include implementations of the diffuser 1200 described above. The display device 40 can be, for example, a smart phone, a cellular or mobile telephone. However, the same components of the display device 40 or slight variations thereof are also illustrative of various types of display devices such as televisions, tablets, e-readers, hand-held devices and portable media players.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. In some implementations, the display 30 can be similar to the reflective display device 900 and include an annular diffuser 1200 discussed above. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 17B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (for example, filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), NEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (for example, an IMOD controller). Additionally, the array driver 22 can be a conventional driver or a bi-stable display driver (for example, an IMOD display driver). Moreover, the display array 30 can be a conventional display array or a bi-stable display array (for example, a display including an array of IMODs). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blue-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other possibilities or implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of an IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A display device, comprising:
a plurality of optical elements, each of the plurality of optical elements including a reflective surface configured to receive light from an incidence direction and reflect at least a portion of the light toward a direction of specular reflection; and
a diffuser layer configured to redistribute at least a portion of the light reflected from the plurality of optical elements into a ring-shaped region between an inner circular region and an outer circular region, the inner circular region and the outer circular region being concentric and disposed around the direction of specular reflection,
wherein the diffuser layer includes a plurality of axicon lenses, each of the plurality of axicon lenses being cone shaped and having a base, an apex, and sloping sidewalls joining the apex to the base.

2. The display device of claim 1, wherein the plurality of axicon lenses is arranged in a random pattern.

3. The display. device of claim 1, wherein an angle between the sloping sidewalls and the base of the cone is selected to provide a desired value for a radius of the inner circular region.

4. The display device of claim 1, wherein at least one of the base and the sidewalls are curved with a curvature.

5. The display device of claim 1, wherein some of the plurality of axicon lenses is disposed over each of the plurality of optical elements.

6. The display device of claim 5, wherein the plurality of axicon lenses number between about 10 and 10,000 axicon lenses per optical element.

7. The display device of claim 5, wherein each of the plurality of axicon lenses has an area of the base that is between approximately 0.01% to approximately 1.0% of an area of the reflective optical element.

8. The display device of claim 1, wherein a density of the plurality of axicon lenses is between approximately $10^5$ per $cm^2$ and approximately $10^9$ per $cm^2$.

9. The display device of claim 1, wherein the diffuser layer includes a plurality of holographic features.

10. The display device of claim 1, wherein an angular width of the inner circular region is between approximately 10 degrees and approximately 30 degrees.

11. The display device of claim 1, wherein an angular width of the outer circular region is between approximately 20 degrees and approximately 60 degrees.

12. The display device of claim 1, wherein each of the plurality of optical elements includes at least one interferometric modulator.

13. A method of manufacturing a display device, comprising:
providing a plurality of optical elements configured to modulate light incident on the display device, each of the plurality of optical elements including a reflective surface configured to receive light from an incidence direction and reflect at least a portion of the light toward a direction of specular reflection; and
providing a diffuser layer that is configured to redistribute at least a portion of the light reflected from the plurality of optical elements into a ring-shaped region between an inner circular region and an outer circular region, the inner and outer circular region being concentric and disposed around the direction of specular reflection,
wherein the diffuser layer includes a plurality of axicon lenses, each of the plurality of axicon lenses being cone shaped and having a base, an apex, and sloping sidewalls joining the apex to the base.

14. The method of claim 13, wherein the diffuser layer includes a plurality of holographic features.

15. The method of claim 13, wherein the plurality of optical elements are disposed on a first side of a substrate, and wherein the diffuser layer is disposed on a second side of the substrate, the second side being opposite the first side.

16. The method of claim 13, wherein the plurality of optical elements and the diffuser layer are disposed on the same side of a substrate.

17. The method of claim 13, wherein each of the plurality of optical elements includes at least one interferometric modulator.

* * * * *